US011311765B2

(12) United States Patent
Cragg et al.

(10) Patent No.: US 11,311,765 B2
(45) Date of Patent: Apr. 26, 2022

(54) ELECTRONICALLY ENABLED ROAD BICYCLE WITH DYNAMIC LOADING

(71) Applicants: Andrew H. Cragg, Edina, MN (US); Gerard von Hoffmann, Rancho Santa Fe, CA (US)

(72) Inventors: Andrew H. Cragg, Edina, MN (US); Gerard von Hoffmann, Rancho Santa Fe, CA (US)

(73) Assignee: Paradox Holdings, LLC, Rancho Santa Fe, CA (US)

( * ) Notice: Subject to any disclaimer, the term of this patent is extended or adjusted under 35 U.S.C. 154(b) by 43 days.

(21) Appl. No.: 16/913,119

(22) Filed: Jun. 26, 2020

(65) Prior Publication Data

US 2021/0016123 A1 Jan. 21, 2021

Related U.S. Application Data

(60) Provisional application No. 62/869,259, filed on Jul. 1, 2019.

(51) Int. Cl.
*A63B 21/005* (2006.01)
*A63B 69/16* (2006.01)
(Continued)

(52) U.S. Cl.
CPC .... *A63B 21/0056* (2013.01); *A63B 21/00069* (2013.01); *A63B 21/22* (2013.01); *A63B 69/16* (2013.01); *A63B 2069/168* (2013.01)

(58) Field of Classification Search
CPC .............. A63B 69/16; A63B 2069/166; A63B 2069/168; A63B 21/005–0059;
(Continued)

(56) References Cited

U.S. PATENT DOCUMENTS 4,674,742 A * 6/1987 Baatz ..................... A63B 69/16
482/59
5,356,348 A 10/1994 Bellio et al.
(Continued)

FOREIGN PATENT DOCUMENTS

JP 2000316272 11/2000
WO WO 2003/034584 4/2003

OTHER PUBLICATIONS

Brown et al., Functional Resistance Training to Improve Knee Strength and Function After Acute Anterior Cruciate Ligament Reconstruction: A Case Study, Sports Health, pp. 1-9, 2020.
(Continued)

*Primary Examiner* — Jennifer Robertson
(74) *Attorney, Agent, or Firm* — Knobbe Martens Olson & Bear LLP

(57) ABSTRACT

A dynamic training system provides elevated load and energy demand on a rider of a moving bicycle out on the road or track. Resistance to movement of the bicycle is provided by a resistance unit which may include an eddy current brake. A processor may generate a control signal that adjusts the resistance to replicate the effort of riding a predetermined course or training protocol. Multiple riders at different times or locations can compete on a common virtual course. A stronger rider can be restrained by a heavier imposed load to keep pace together with a weaker rider, without compromising total power expenditure to keep the riders together.

31 Claims, 4 Drawing Sheets

(51) Int. Cl.
*A63B 21/00* (2006.01)
*A63B 21/22* (2006.01)

(58) Field of Classification Search
CPC .... A63B 21/00069; A63B 21/22; B62J 45/00; B62J 99/00
See application file for complete search history.

(56) References Cited

U.S. PATENT DOCUMENTS

| | | | |
|---|---|---|---|
| 5,656,001 A | | 8/1997 | Baatz |
| 5,752,898 A | * | 5/1998 | Porkka ................... A63B 69/16 482/105 |
| 5,910,714 A | * | 6/1999 | Buchanan ................ B62M 6/45 318/139 |
| 5,916,067 A | * | 6/1999 | Morasse ................ A63B 69/16 482/61 |
| 6,173,801 B1 | | 1/2001 | Kakutani et al. |
| 6,450,922 B1 | | 9/2002 | Henderson et al. |
| 6,945,916 B2 | | 9/2005 | Schroeder |
| 6,964,633 B2 | | 11/2005 | Kolda et al. |
| 7,011,607 B2 | | 3/2006 | Kolda et al. |
| 8,162,803 B2 | | 4/2012 | Schroeder et al. |
| 9,236,761 B2 | * | 1/2016 | Strothmann ............. B60Q 1/00 |
| 9,259,633 B2 | | 2/2016 | Meyers |
| 9,517,376 B2 | | 12/2016 | Hamilton |
| 9,999,818 B2 | | 6/2018 | Hawkins, III et al. |
| 10,040,509 B1 | * | 8/2018 | Lee ........................ H04W 4/029 |
| 10,046,222 B2 | | 8/2018 | Hawkins, III et al. |
| 10,285,625 B2 | | 5/2019 | Hawkins, III et al. |
| 10,449,416 B2 | | 10/2019 | Dalebout et al. |
| 10,500,440 B2 | | 12/2019 | Hawkins, III et al. |
| 10,576,348 B1 | | 3/2020 | Hawkins, III et al. |
| 10,610,759 B2 | | 4/2020 | Hsu |
| 10,695,638 B2 | | 6/2020 | Hawkins, III et al. |
| 10,702,736 B2 | | 7/2020 | Weston et al. |
| 2002/0055422 A1 | | 5/2002 | Airmet et al. |
| 2003/0073546 A1 | | 4/2003 | Lassanke et al. |
| 2004/0166996 A1 | | 8/2004 | Kolda et al. |
| 2005/0140113 A1 | | 6/2005 | Kokatsu et al. |
| 2008/0066979 A1 | | 3/2008 | Carter |
| 2008/0071436 A1 | | 3/2008 | Dube et al. |
| 2009/0224508 A1 | | 9/2009 | Scarborough |
| 2010/0243349 A1 | | 9/2010 | Nomura et al. |
| 2010/0276906 A1 | | 11/2010 | Galasso et al. |
| 2011/0254673 A1 | | 10/2011 | Jean et al. |
| 2012/0169154 A1 | | 7/2012 | Curodeau |
| 2014/0171266 A1 | | 6/2014 | Hawkins, III et al. |
| 2015/0011368 A1 | | 1/2015 | Manor et al. |
| 2015/0114734 A1 | * | 4/2015 | Ogawa ..................... B62M 6/90 180/68.5 |
| 2015/0343290 A1 | | 12/2015 | Freiberg |
| 2016/0101337 A1 | * | 4/2016 | Hsu ........................ A63B 69/16 482/61 |
| 2017/0128764 A1 | * | 5/2017 | Hsu ..................... A63B 21/0056 |
| 2017/0151991 A1 | | 6/2017 | Hur |
| 2018/0207466 A1 | | 7/2018 | Krishnan et al. |
| 2018/0326868 A1 | * | 11/2018 | Lee ........................ B60L 50/20 |
| 2019/0103754 A1 | * | 4/2019 | Mali ..................... H02J 7/1446 |

OTHER PUBLICATIONS

Hands-on: The AIRhub on-road cycling resistance unit, DC Rainmaker, Jan. 31, 2017; https://www.dcrainmaker.com/2017/01/airhub-cycling-resistance.html.

* cited by examiner

ELECTRONICALLY ENABLED ROAD BICYCLE WITH DYNAMIC LOADING

This application claims the priority benefit under 35 U.S.C. § 119(e) of U.S. Provisional Application No. 62/869,259, filed Jul. 1, 2019, the entirety of which is hereby incorporated by reference herein.

BACKGROUND OF THE INVENTION

Outdoor cycling is one of the most common fitness activities in the world. Modern road bicycles are designed to travel at high speeds over varied terrain by using light materials and sophisticated gearing. Nonetheless, it is the rider who is responsible for supplying power to the drivetrain. Road cyclists vary greatly in ability and goals.

Competitive cyclists may train over long distances and many hours to obtain the desired training effect. Contrary to activities such as running, road cycling results in significant intervals when power output is low due to changes in terrain. Competitive cyclists may increase their training effect by riding on hills that naturally increase riding resistance.

Recreational cyclists frequently ride in a group, but it is often difficult for riders of different abilities to stay together. Riding outside has other disadvantages such as the risks associated with riding long distances on streets with traffic and uneven road surfaces. Cold weather also limits the riding season for many cyclists as the wind chill from riding at relatively high speeds can make the activity uncomfortable.

For these reasons, many cyclists now ride indoors, affixing their bikes to magnetic resistance trainers. While safe and warm, this activity is considered boring by many. Social platforms have arisen that seek to emulate group riding and make the activity more social and competitive.

So, despite the numerous cycling products that have developed over time, there remains a need for a system that can offer the outdoor cycling experience yet minimize disadvantages such as those described above.

SUMMARY OF THE INVENTION

There is provided in accordance with one aspect of the invention a resistance training device, configured for mounting on a bicycle and imposing resistance to motion without interfering with the ability of the bicycle to travel along the ground, in response to pedaling by a rider. The resistance training device thus provides some of the features on an indoor stationary training device and at the same time enables the rider to experience those features while actually travelling along a road, track or trail.

The resistance training device includes a support; a connector on the support for connection to a bicycle frame; and a roller configured to frictionally engage a wheel on the bicycle when the connector is connected to the frame. A conductive disc is configured to rotate in response to rotation of the roller. The device further includes a source of a magnetic field; and a control, for increasing or decreasing exposure of the disc to the magnetic field. The performance of the rolling bicycle is thus influenced by the effects of a frictionless eddy current damper which, when engaged, increases the effort required to be exerted by the rider to sustain a given speed, compared to when the eddy current damper is disengaged.

The source may be at least one electromagnet, or at least one permanent magnet. In some embodiments, the source may be at least six or 12 or 18 or more permanent magnets.

The permanent magnets may be supported by a frame, which may be movable between a first relationship with the disc, and a second, different relationship with the disc. The first relationship exposes the disc to a first magnetic field intensity, and the second relationship exposes the disc to a second, lower magnetic field intensity, which lower intensity may be approximately zero. The first relationship may position the disc between at least two opposing magnets. The wheel may have a first axis of rotation, and the frame is pivotable about a second axis of rotation that is substantially parallel to the first axis of rotation.

The connector may be configured for connection to the bicycle such as by connection to a seat tube or a seat post on the bicycle. The connector may have a tool less quick connect lever.

The resistance training device may further comprise a plurality of fins for dissipating heat. The roller and the conductive disc may be coaxial. The control may be mounted to the frame or to the bicycle such as being configured for mounting to a handlebar.

The resistance training device may additionally include a protective guard adjacent the conductive disc, to prevent contact between the rider or clothing and the disc which can become hot.

The resistance training device may also include a controller for increasing or decreasing exposure of the disc to the magnetic field in accordance with a preselected pattern. At least one sensor may be provided, such as a gyroscope, accelerometer, altimeter, GPS, wind sensor, thermometer, inclination sensor, or sensors for collecting data (e.g., force, compression, torque, time and angle) which enables the calculation of power exerted, for capturing data relating to one or more parameters of load and/or performance. Any of a variety of wireless protocol transmitters (e.g., Bluetooth, ANT, ANT+) may be provided for transmitting data to a remote device such as a smart phone or power meter, which may be carried on a handlebar. In some embodiments, the resistance training device further comprises a power supply such as at least one battery, capacitor or generator for generating electricity in response to movement such as rotation of a component on the bicycle.

In accordance with another aspect of the invention, there is provided a resistance training device configured to provide the rider with a virtual experience of riding a preselected course. The previously described resistance training device is further provided with a processor, configured to receive data representing features of a selected route, and to generate control signals which modify the resistance to cause the bicycle to perform such that the rider has the same experience as though they were actually riding on the preselected route. The data representing features of a selected route may be stored in a memory in direct wired communication with the processor, in a remote device such as a smart phone, or in the cloud.

In accordance with another aspect of the invention, a first resistance training device is configured to provide a first rider with a virtual competition with a second rider of a bicycle equipped with a second resistance training device. The first and second riders each download a common preselected course, and begin a ride. Performance data from the second rider may be wirelessly received by the resistance training system of the first rider (by the first rider's smart phone or receiver in an electronics module carried by the resistance training device) and vice versa, to allow each to monitor the other's performance. The riders may be travelling on the same actual physical course at the same or different times, or may be geographically remote from each other.

In accordance with another aspect of the invention, a first resistance training device is configured to provide a first rider with a variable resistance level to compensate for strength or power differences between the first rider and a second rider of a bicycle which may or may not be equipped with a second resistance training device. In one implementation, the first resistance training device is provided with a proximity sensor (e.g., WiFi, Bluetooth, GPS, RFID) for determining the proximity of the second rider. The second rider may have a source of a signal that is detectable by the proximity sensor. The first resistance training device is configured to elevate the resistance in response to increasing distance between the two riders, to slow the stronger first rider and keep the riders in close physical proximity while allowing the first rider to experience a higher level of exertion.

There is provided in a further aspect of the invention, a dynamic, electronically enabled training system, for providing a virtual riding experience to a rider who is actually riding on a different riding course. The system comprises a user powered vehicle such as a bicycle comprising at least one wheel configured to move and drive the vehicle forward along the ground when the user powered vehicle moves in response to exertion by the rider. A memory is configured to store one or more virtual digital routes along which the user powered vehicle is configured to simulate travel. A variable resistance unit is configured to apply a variable resistance to movement of the at least one wheel; and a processor is communicatively coupled to the memory and configured to receive a feature of one virtual digital route of the one or more virtual digital routes that the user powered vehicle is traveling, receive an input from a sensor coupled to the user powered vehicle, and generate a signal to adjust the variable resistance of the variable resistance unit to simulate load conditions corresponding to the virtual digital route.

DETAILED DESCRIPTION OF THE PREFERRED EMBODIMENT

The present invention provides a dynamic training system for increasing load and energy demand on a rider of a moving bicycle out on the road or track. In one implementation described in greater detail below, resistance to movement of the bicycle is provided by a resistance unit which may include an eddy current brake. The eddy current brake includes a nonmagnetic, electrically conductive disk and at least one magnet moveable relative to each other, such as a disc rotatably mounted within the magnetic field of one or more fixed permanent magnets or electromagnets. The magnets introduce eddy currents in the disk when the disk is rotating, with the effect of producing a smooth, frictionless resistance to rotation.

Figure 1:
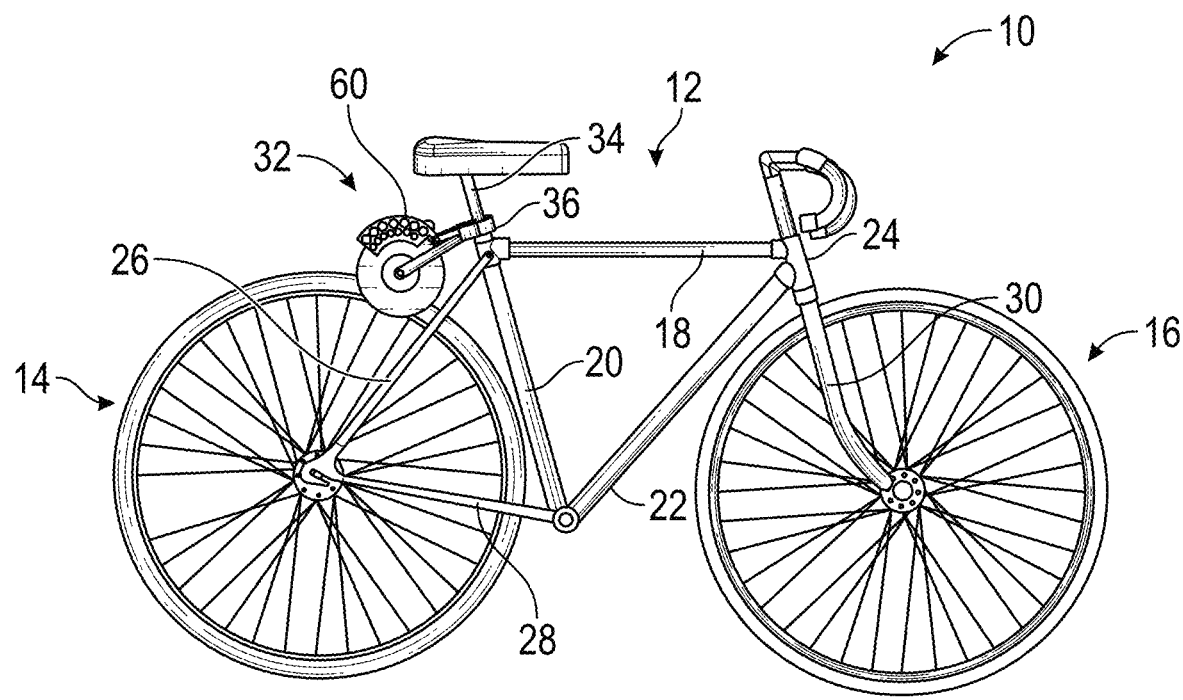
FIG. 1 is a side elevational view of a bicycle having a resistance unit mounted thereon.

Referring to FIG. 1, there is schematically illustrated a bicycle 10 having a frame 12 supported by a rear wheel 14 and a front wheel 16 as is understood in the art. The frame 12 comprises a top tube 18 which forms a triangle along with a seat tube 20 and a down tube 22. The front of the top tube 18 and down tube 22 are joined at a head tube 24. The rear wheel 14 is supported by left and right seat stays 26 and left and right chain stays 28. The seat stays 26, chain stays 28 and front forks 30 are bilaterally symmetrical as is understood in the art and therefore only one side will be discussed herein.

A resistance unit 32 in accordance with the present invention may be secured with respect to the frame 12 and provide resistance to rolling movement of at least one of rear wheel 14 and front wheel 16. In the illustrated embodiment, the resistance unit 32 provide resistance to rotation of the rear wheel 14, and is connected to at least one of the chain stay 28, seat tube 20, top tube 18 or seat post 34.

In the illustrated embodiment, the resistance unit 32 is releasably secured via a connector 36 with respect to the frame, such as to seat post 34. The connector 36 carries a resistance unit housing or frame 38 which rotatably supports at least one roller 40 and a disc 48.

Figure 3:
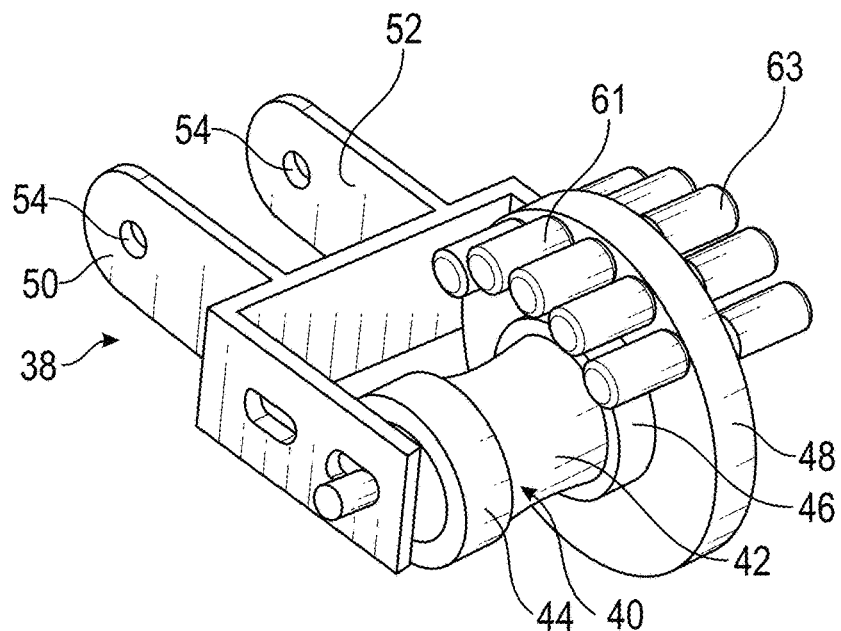
FIG. 3 is a partial perspective view of a resistance unit in accordance with the present invention.

Referring to FIG. 3, roller 40 is configured to frictionally engage and rotate with a corresponding wheel, such as rear wheel 14. An annular concavity 42 is defined between first and second side walls 44, 46 to optimize friction and force transfer from the wheel 14 to the roller 40, and also keep the roller 40 properly aligned with the wheel 14. The surface of the concavity 42 may be provided with a friction enhancing surface such as a plurality of ridges, or roughened surface texture, or a coating or layer of a polymeric (e.g., rubber) material to resist slipping relative to the bicycle tire.

The roller 40 is in rotational engagement with the disc 48 such that, when engaged, rolling of the wheel 14 causes rotation of the roller 40, which in turn cases rotation of the disc 48. In the illustrated example, roller 40 is coaxial with and on one side of the disc 48, and rotation of the roller 40 and disc 48 is 1:1. Alternatively, a second disc 48' (not illustrated) may be mounted on a second side of the roller 40 such as to accommodate additional magnets or other design objective. The disc 48 may be a separate structure, or may be integrally formed with the roller 40, such as by increasing the diameter of one or both of the side walls 44 and 46 to form one or two integral discs, leaving space between the medial side of the side walls 44, 46 and the wheel 14 to accommodate rotation without contact between the disc 48 and wheel 14.

Figure 2:
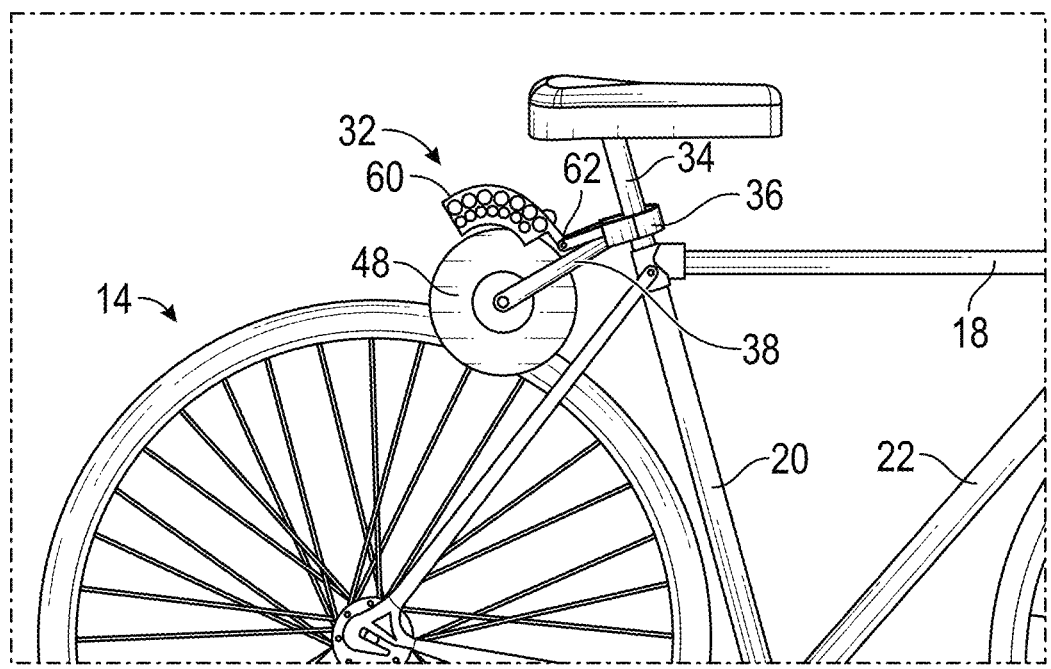
FIG. 2 is an enlargement of a portion of FIG. 1, showing a resistance unit in a disengaged configuration.

The frame 38 may comprise a first strut 50 and optionally a second strut 52 each optionally having a pivotable connector 54 allowing the frame to pivot towards or away from the wheel 14 with respect to a point of attachment such as connector 36. The frame may also carry a magnet support 60 (FIG. 2) having one or more movable points of attachment 62 with respect to the frame 38 allowing the magnet support 60 to be moved towards or away from the disc 48. As will be apparent from the discussion of eddy currents, below, the magnet support 60 may be configured to move within the plane of the disc (as illustrated) between a more engaged orientation (FIG. 1) and a less engaged configuration (FIG. 2). Alternatively, the magnet support 60 may be moveable in the medial lateral direction, or transverse to the plane of the disc 48, to adjust the spacing between the magnets and the disc 48. In an embodiment utilizing electromagnets, the magnet support may be immovably mounted with respect to the disc and the intensity of the magnetic field can be varied to adjust resistance as will be apparent to those of skill in the art.

The magnet support 60 is configured to hold a plurality of magnets 64 such that when engaged the disc 48 is within a magnetic field of but outside of physical contact with any magnets 64. The number and size of the magnets can be varied widely, depending upon the desired performance. Magnets can be carried in opposing pairs, on left and right sides of the disc, such as from at least two magnets to about 50 magnets, and in some embodiments from about 10 magnets to about 30 magnets, evenly distributed on either side of the disc. In the embodiment of FIG. 3, the magnet support 60 is removed to show the locations of 10 magnets in relation to the disc 48 with a first set 61 on a first side and a second set of magnets 63 on a second side of the disc 48.

The magnets may be of one or more types including permanent Rare Earth magnets composed of neodynium element or electromagnets constructed of electrically conductive wire that is wound around a metallic core.

The magnets may vary in shape and dimensions. For example, the magnets may have a cylindrical, cuboid or arc shape. Dimensions for a cylindrical magnet may vary from 0.125-1.0 inches for the diameter and from 0.062-1.0 inches in length. Other magnetic shapes may vary similarly in terms of dimensions.

The magnets are illustrated as lying along an arc that has a center of rotation that is concentric with the center of rotation of the disc 48. The resistance unit 32 illustrated in FIG. 2 has two rows of magnets on each side of the disc, with each row aligned along an arc concentric with the rotational axis of the disc. The radius of the arc affects the applied resistance as discussed further below. In general, the radius will be within the range of from about 2.0 to about 6.0 inches.

Alternatively, the magnets may be electromagnets rather than permanent magnets. Electromagnets of 0.5-2.5" diameter may have pull forces of 50-500 N using DC input with 12-24V battery sources. Electromagnets would permit variable resistance without the need to move the magnet housing in relation to the disc.

The magnet support 60 may be manually moved relative to the disc, to adjust the resistance between zero and a maximum determined by a variety of factors discussed below. Alternatively, the magnet support may be connected such as via a control cable to a control such as knob or lever on the handle bar or frame, so that the resistance level can be adjusted by a rider via a remote control while the bike is in motion. Adjustment may be continuous throughout a range. Alternatively, the resistance may be indexed such that the rider perceives a click or stop at each of a series of resistance levels such as zero, low, medium or high, corresponding to the location of the magnet support 60 relative to the disc 48.

Resistance levels can be calibrated to a use case that will be understood by the rider. For example, a lever, knob or other control may have an 'off' or disengaged position in which no resistance is provided. The control may be moved to a series of positions in which the resistance on a flat course is equivalent to a hill having a slope of between 2.0 to 20.0% assuming no wind or other outside influence.

The resistance unit 32 may additionally be provided with any of a variety of electronics such as to record data for real time feedback or subsequent diagnostic evaluation. Parameters like running time with resistance engaged, speed, resistance level, expended power (instantaneous, peak, average, normalized, total) and others may be captured. On board electronics may include force or power sensors, temperature sensors, one or more processors, a power supply, Bluetooth, ANT+ or other wireless protocol or WIFI chip to enable communication with any of a variety of devices such as smart phones, power meters, cycling computers or other devices as desired. Power may be supplied by one or more batteries or an on-board generator, that may be rotationally engaged with the wheel, disc 48 or roller 40.

The resistance unit 32 may additionally be programmed to provide variable resistance that is determined by input from a variety of sources including GPS, real-time weather or onboard sensors. For instance, a rider may download and input a course file from a different location that contains the GPS terrain data. The unit can then re-create that "virtual course" on the rider's own roads. Changes in resistance could be made to emulate the (terrain) on the virtual course and even make adjustments for wind speed and direction.

Riders in different locations could ride the same virtual courses for social or competitive reasons. The virtual courses and associated data could be displayed on a computer screen attached to the handlebars of the bicycle. In this fashion, the rider could monitor the route for upcoming "hills" and "descents" and track progress relative to remote riders.

The Resistance unit 32 could also be linked to similar units via BTLE or Ant+ signaling so that resistances could be adjusted based on a predetermined input. For instance, an "electronic tether" could be created so that the resistance on a leading unit is increased whenever the unit gets too far ahead of the second unit. In this fashion, a stronger rider would see resistance increase whenever he or she got too far ahead of a companion thus encouraging a closer riding relationship between 2 different bicycles and riders.

In still another social format, a number of units could be programmed with resistances that are calibrated to each rider's individual functional threshold power (FTP) so that each rider is essentially now riding on an equal footing with paired riders. Similar to a handicap in golf, the units could permit a new type of competition whereby all riders are starting with "physiologic equality" based on their own "FTP handicap".

Figure 4A:
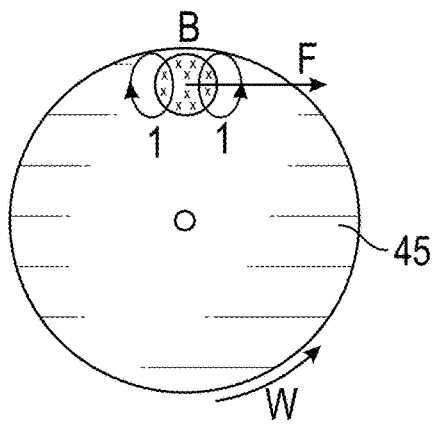
FIGS. 4A and 4B illustrate the operating principles of a magnetic eddy current resistance unit.

Generally, eddy current brakes convert kinetic energy into electrical currents with the motion of a conductor through a magnetic field. Eddy currents, which are localized circular electric currents I within a conductor, slow or stop a moving object by dissipating kinetic energy as heat, thus providing a non-contact dissipative force F that is proportional and opposite to the velocity of the movement w, as illustrated in FIG. 4A.

A variety of factors influence the level of resistance provided by a rotational disc system, summarized as follows:

$$\tau = \sigma * A * d * B^2 * R^2 * \omega \tag{1}$$

Figure 4B:
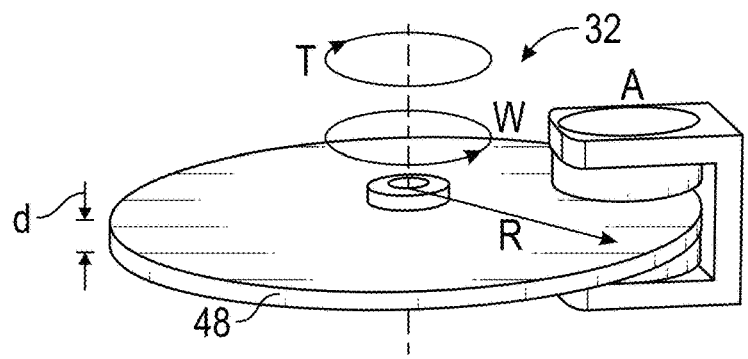

In this equation, resistive torquer depends on the conductivity of the disc material a, area of the disc exposed to the magnetic field A, the thickness of the disc d, the magnitude of the magnetic field strength B, the effective radius of the disc R, and the angular velocity of the disc rotation a, as shown in FIG. 4B. In some embodiments, this means that simply changing the area of the disc exposed to the magnetic field can change the resistive properties of the resistance unit 32. Additional details are disclosed in U.S. Patent Publication No. 2018/0207466, the disclosure of which is hereby incorporated in its entirety herein by reference.

Figure 6A:
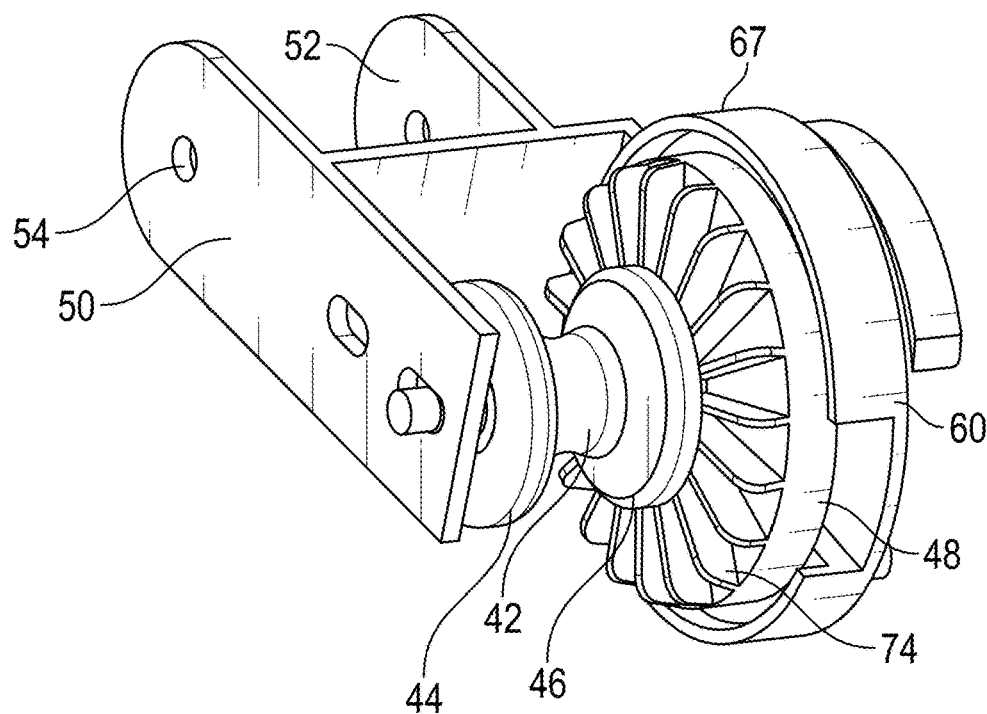
FIGS. 6A and 6B show a modification of the resistance unit of FIG. 3, having bilaterally asymmetric magnets and a cooling fan.
Figure 6B:
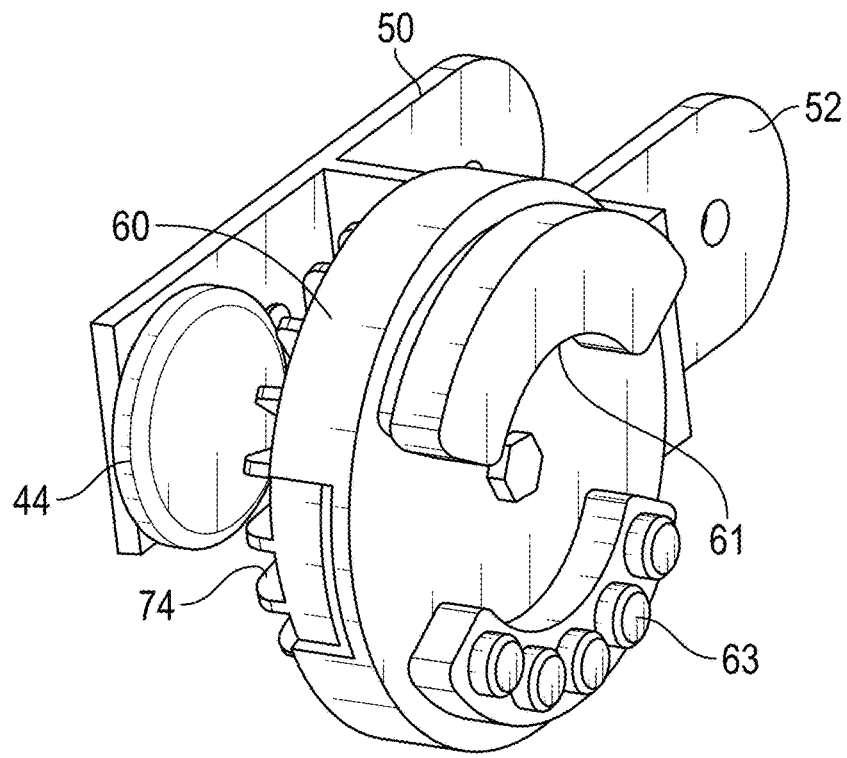

Referring to FIGS. 6A and 6B, there is illustrated a resistance unit 32 which is a modification of that illustrated in FIG. 3, having an added thermal management feature. The first set 61 and second set 63 of magnets are both located on a first side of disc 48. The opposing, second side of disc 48 is provided with a plurality of fins to provide a heat sink which can also function as a fan to dissipate heat accumulated as a result of the conversion from mechanical energy to heat. For simplicity, the mechanism for moving the magnets sets 61 and 63 closer to or farther from the disc 48 is not illustrated.

A guard 67 may also be provided, to prevent accidental contact by the rider or clothing with the potentially hot disc 48. In the illustrated embodiment, the guard 67 is in the form of an arcuate flange which at least partially encloses the perimeter of the disc 48 and may be attached to the magnet support 60.

Figure 5:
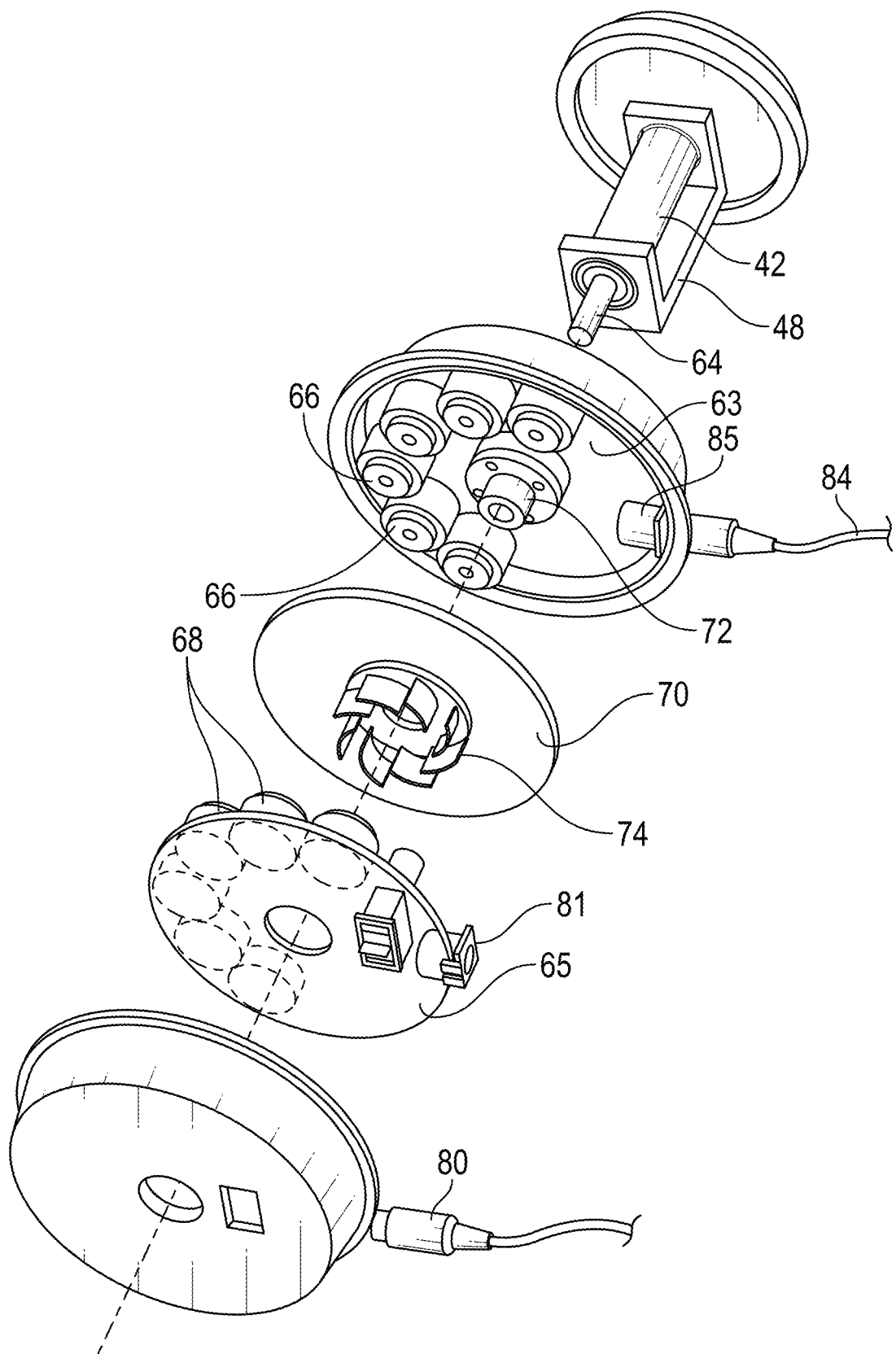
FIG. 5 is a perspective exploded view of an alternate resistance unit having a cooling fan.

Referring to the particular implementation of FIG. 5, a nonmagnetic, electrically conductive circular disk 70 is mounted on a shaft 64 so that it rotates along with the shaft. The circular disk 70 is mounted on the shaft 64 between the opposing sets of electromagnets 66 and 68. The disk 70 may be supported on the shaft 64 by a cylindrical support bracket 72 on one side and may be provided with a rotatable fan 74 on one or both sides. The fan 74 includes a plurality of fan blades that extends outward from one or both surfaces of the disk 70. As the shaft 44, and thus disk 70, and fan 74 rotate, the fan produces a flow of air that cools the disk 70 and the electromagnets 66 and 68, and depending upon the configuration also the electronics (not shown) used to regulate the flow of power to the electromagnets in an electromagnet embodiment. The fan blades provide additional cooling by acting as a high surface area heat sink for the disc.

The opposing sets of electromagnets 66 and 68 are connected to an electrical drive circuit (not shown) located on supporting circuit boards 63 and 65. The electrical drive circuit is in turn connected to an internal battery or generator (not illustrated) or an external power source by an electrical cable 80 or 84. The electrical drive circuit energizes the electromagnets 62 and 64 at predetermined times and power levels to produce magnetic fields between the opposing sets of magnets 62 and 64. In this embodiment, the magnets function as typical electromagnets. In the non-electrical embodiment, the magnets are of the Rare Earth type, usually neodymium or samarium-cobalt magnets.

As a bicyclist pedals, the eddy current disk 70 rotates within the magnetic fields produced by the electromagnets 66 and 68. The eddy current disk 70 is formed of a nonmagnetic, electrically conductive material. Therefore, the magnetic fields produced by electromagnets 66 and 68 produce eddy currents within the structure of the disk 70 as it rotates. The interaction between the electromagnetic fields produced by the eddy currents within the disk 70 creates a torque/resistance to the rotation of the shaft 64, and thus rear wheel 16.

The structure and operation of the electrical drive circuit and electromagnets 66 and 68 are well known to those of ordinary skill in the art.

The use of electromagnets allows individual or groups of magnets to be energized at specified times and voltages to produce variable torques, and resistances to the rotation of the bicycle's rear wheel. The use of electromagnets allows the resistance or braking force to be set to any desired level or varied in order to duplicate actual road conditions experienced by a bicycle rider.

The torque/resistance produced by the eddy current brake 26 may be increased or decreased manually or automatically in order to simulate changes in terrain. For example, the electrical control circuit may be used to adjust the power energizing the electromagnets 62, thus adjusting the amount of torque/resistance produced by the eddy current brake to simulate the resistance experienced by cycling over a known course having varying topography. In one example, the rider who is confined geographically to a riding on flat terrain, could program a resistance course that would simulate hills of any grade or length. In another example, a rider who wishes to achieve greater training effect could program a resistance that would require a minimum or stable power output regardless of terrain.

In certain implementations of the invention, the eddy current disk 70 is formed of an aluminum alloy. However, the resistivity of aluminum alloys changes as a function of temperature. When an eddy current brake 26, having a disk 70 formed of an aluminum alloy is used for a sufficient duration or at high RPM, the disk may heat up to sufficient temperatures to change the resistivity of the disk. As the resistivity of the disk changes, the torque/resistance produced by the eddy current also changes. The change in torque/resistance as a function of temperature results in inaccurate measurements of the user's energy output and thus, performance. If the disk 70 is subjected to sufficient temperatures, the temper of the aluminum alloy can also change.

Thus, the disk 70 used in the eddy current brake 32 may alternatively be formed of a copper alloy containing between approximately 5.0% to 15.0% zinc by weight. In one embodiment, the disk 70 is formed of a copper alloy that includes about 90% copper and about 10% zinc. A suitable copper alloy is commercially available and sold under the term "commercial bronze." In alternate embodiments of the invention, copper alloy comprising about 85% copper and about 15% zinc, commonly referred to as "red bronze," may also be used. Additional alloy details may be found in U.S. Pat. No. 5,656,001, the contents of which are hereby incorporated in their entirely herein by reference.

In general, disc 70 will typically have a diameter within the range of from about 2.0 inches to about 6.0 inches, and in some implementations from about 1.0 to about 3.0 inches depending upon desired performance and form factor. The thickness will typically be within the range of from about 0.5 inches to about 2.5 inches.

Although the preset invention has been described primarily in the context of a magnetic eddy current brake, other types of resistance mechanisms may be utilized depending upon the desired form factor and performance. For example, rotary dampers (sometimes called dashpots) may be suitable for use in the present invention depending upon the desired performance. These are precision fluid damping devices which give a smooth resistance to shaft rotation which increases with angular velocity.

Silicone fluid (Polydimethyl Siloxane) is a suitable damping medium because of its stable viscous properties. A variety of other dampening media may also be used such as fluorocarbon gels or other viscous grease products, water or air depending upon damper design and intended performance. Dashpots are normally vacuum filled and sealed for life, and the housing or coatings on the housing can comprise materials having good corrosion resistance in the intended use environment.

Damping can be adjusted in the case of dampers that utilize electro-rheological fluid (ERF) or magneto-rheological fluid (MRF), by changing the viscosity of the fluid.

In an MRF damper, micron-sized, magnetically polarized particles are suspended in a carrier fluid such as silicone oil or mineral oil. MRF is capable of responding to an applied magnetic field in a few milliseconds. The material properties of an MRF can change rapidly by increasing or decreasing the intensity of the applied magnetic field. The material property can be viewed as a controllable change in the apparent viscosity of the fluid by varying the current supplied to, for example, an adjacent electromagnet. A higher fluid apparent viscosity can be exploited to provide a higher damping force or pressure-drop across an MRF valve.

Energy to drive the electromagnets and/or MRF damper resistance and associated electronics can be supplied by a battery, solar cells, or an on-board generator to scavenge electricity from a wheel, the resistance unit, or other source of rotational motion. A control may be provided to allow the rider to toggle between a low resistance and a high resistance mode, or to also adjust the resistance to intermediate values as desired.

In one exemplary implementation of the present invention, there is provided a dynamic damping system to compensate for performance differences between bicycle riders. The system comprises a first rider powered bicycle comprising at least one wheel configured to rotate and advance the bicycle along the wound in response to pedaling by the rider; a first communication circuit configured to communicate with a remote electronic device via a communication link; a variable resistance unit configured to provide a variable resistance to rotation of the at least one wheel; and a first hardware processor communicatively coupled to the variable resistance unit and the first communication circuit. The processor may be configured to receive a signal from a second communication circuit of a second rider powered bicycle, the signal comprising at least a second parameter associated with the second rider powered bicycle, identify at least a first parameter associated with the first rider powered bicycle corresponding with the at least a second parameter associated with the second rider powered bicycle, and generate a compensation signal to adjust the resistance level of the variable resistance unit based on the at least a second parameter associated with the second rider powered bicycle and the at least a first parameter associated with the first rider powered bicycle.

The remote electronic device may comprise at least one of a wireless access point, a cellular communication tower, a satellite, and a mobile device of the rider. The remote mobile device of the user may comprise at least one of a cellular phone, a laptop, a tablet, a personal digital assistant, a smart watch, and a global positioning system ((IPS) device. The communication circuit may comprise at least one of a Bluetooth communication circuit, a Wi-Fi communication circuit, and a cellular communication circuit.

The first and second parameters may relate to relative locations of the first and second riders, and the control signal increases the resistance experienced by the first rider to decrease the first rider's speed to more closely match the second rider's speed. The first hardware processor may be further configured to generate an instruction for transmission to a second hardware processor of the second rider powered bicycle to instruct another variable resistance unit coupled to the second rider powered bicycle to adjust a variable resistance of the other variable resistance unit. The first hardware processor may be further configured to receive an instruction from another hardware processor of the second rider powered bicycle to adjust the variable resistance unit.

There is also provided a dynamic, electronically enabled training system, comprising: a rider powered vehicle comprising at least one wheel configured to rotate and advance the vehicle along the ground in response to activity by the rider; a variable resistance unit configured to provide a variable resistance to rotation of the at least one wheel; and a processor communicatively coupled to the memory and configured to: receive a feature of a virtual digital route along which the user powered vehicle is virtually traveling, receive an input relating to the actual route along which the vehicle is actually travelling, from a sensor coupled to the rider powered vehicle, and generate a control signal to adjust the variable resistance of the variable resistance unit to simulate load conditions corresponding to the virtual digital route.

The system may further comprise a communication circuit configured to communicate with a remote electronic device via a communication link, wherein the electronic device comprises at least one of a wireless access point, a cellular communication tower, a satellite, and a mobile device of the user. The mobile device of the user may comprise at least one of a cellular phone, a laptop, a tablet, a personal digital assistant, a smart watch, and a global positioning system (GPS) device. The communication circuit may comprise at least one of a Bluetooth communication circuit, a Wi-Fi communication circuit, and a cellular communication circuit. The user powered vehicle may comprise a vehicle selected from the group consisting of a pedal cycle, a hand-cranked cycle, a rowing cycle, a treadle cycle, a balance bicycle, a caster board, and a moped. The virtual digital route may be stored in the memory. The virtual digital route may be stored in the remote electronic device. The control signal may cause the variable resistance unit to apply resistance as needed to elevate resistance provided by the actual route to reach resistance necessary for the rider to experience.

What is claimed is:

1. A resistance training device, configured for mounting on a bicycle and imposing resistance to motion without interfering with the ability of the bicycle to travel along the ground, comprising:
   a support;
   a connector on the support for connection to a bicycle frame;
   a roller configured to frictionally engage a wheel on the bicycle when the connector is connected to the frame;
   a conductive disc configured to rotate in response to rotation of the roller;
   a source of a magnetic field; and
   a control, for increasing or decreasing exposure of the disc to the magnetic field.

2. A resistance training device as in claim 1, wherein the source is at least one electromagnet.

3. A resistance training device as in claim 1, wherein the source is at least one permanent magnet.

4. A resistance training device as in claim 1, wherein the source is at least six permanent magnets.

5. A resistance training device as in claim 4, wherein the permanent magnets are supported by a frame.

6. A resistance training device as in claim 5, wherein the frame is movable between a first relationship with the disc, and a second, different relationship with the disc.

7. A resistance training device as in claim 6, wherein the first relationship exposes the disc to a first magnetic field intensity, and the second relationship exposes the disc to a second, lower magnetic field intensity.

8. A resistance training device as in claim 7, wherein the first relationship positions the disc between at least two opposing magnets.

9. A resistance training device as in claim 8, wherein when the training device is engaged with a wheel on a bicycle, the wheel has a first axis of rotation, and the frame is pivotable about a second axis of rotation that is substantially parallel to the first axis of rotation.

10. A resistance training device as in claim 1, wherein the connector is configured for connection to a seat tube on the bicycle.

11. A resistance training device as in claim 1, wherein the connector is configured for connection to a seat post on the bicycle.

12. A resistance training device as in claim 1, further comprising a plurality of fins for dissipating heat.

13. A resistance training device as in claim 1, wherein the roller and the conductive disc are coaxial.

14. A resistance training device as in claim 1, wherein the control is mounted to the frame.

15. A resistance training device as in claim 1, wherein the control is configured for mounting to a handlebar.

16. A resistance training device as in claim 1, further comprising a protective guard adjacent the conductive disc.

17. A resistance training device as in claim 1, further comprising a controller for increasing or decreasing exposure of the disc to the magnetic field in accordance with a preselected pattern.

18. A resistance training device as in claim 1, further comprising at least one sensor for capturing data relating to a parameter of performance.

19. A resistance training device as in claim 18, further comprising a transmitter for transmitting data to a remote device.

20. A resistance training device as in claim 1, further comprising a generator for generating electricity.

21. A resistance training device as in claim 1, further comprising a processor configured to cause the control to increase or decrease exposure of the disc to the magnetic field.

22. A resistance training device as in claim 21, wherein the processor is communicatively coupled to a memory and configured to:
receive a feature of a virtual digital route along which the training device is virtually traveling, and generate a control signal to cause the control to increase or decrease exposure of the disc to the magnetic field, to simulate load conditions corresponding to the virtual digital route.

23. A resistance training device as in claim 21, further comprising a communication circuit configured to communicate with a remote electronic device via a communication link.

24. A resistance training device as in claim 23, wherein the electronic device comprises at least one of a wireless access point, a cellular communication tower, a satellite, and a hand held mobile device.

25. A resistance training device as in claim 23, wherein the communication link is a wireless link.

26. A resistance training device as in claim 22, wherein the virtual digital route is stored in a remote electronic device.

27. A resistance training device as in claim 22, wherein the virtual digital route is stored in the memory.

28. A resistance training device as in claim 1, further comprising at least one sensor for collecting data which enables calculation of power exerted.

29. A resistance training device as in claim 28 comprising a force sensor.

30. A resistance training device as in claim 28, comprising a time and angle sensor.

31. A resistance training device as in claim 28 comprising a torque sensor.

* * * * *